(12) United States Patent
Tayloe et al.

(10) Patent No.: US 7,505,438 B2
(45) Date of Patent: Mar. 17, 2009

(54) SYSTEM AND METHOD FOR POWER-OPTIMIZED USER LOADING OF A CDMA COMMUNICATION SYSTEM

(75) Inventors: Daniel R. Tayloe, Phoenix, AZ (US); Chih-Ming J. Chiang, Chandler, AZ (US); Mark H. Kaya, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 736 days.

(21) Appl. No.: 10/979,935

(22) Filed: Nov. 2, 2004

(65) Prior Publication Data

US 2006/0092903 A1    May 4, 2006

(51) Int. Cl.
*H04B 7/216* (2006.01)
(52) U.S. Cl. .................... 370/335; 370/342
(58) Field of Classification Search ............... 370/252, 370/328, 335, 338, 342
See application file for complete search history.

(56) References Cited

U.S. PATENT DOCUMENTS

| | | | |
|---|---|---|---|
| 6,907,060 B2* | 6/2005 | Yang | 375/141 |
| 6,944,147 B2* | 9/2005 | Chheda | 370/342 |
| 6,970,439 B2* | 11/2005 | Bi et al. | 370/329 |
| 6,980,811 B2* | 12/2005 | Harris | 455/452.1 |
| 2004/0120290 A1* | 6/2004 | Makhijani et al. | 370/335 |
| 2004/0192315 A1* | 9/2004 | Li et al. | 455/447 |
| 2005/0107107 A1* | 5/2005 | Shahidi et al. | 455/522 |
| 2005/0190852 A1* | 9/2005 | Kamel et al. | 375/295 |

* cited by examiner

*Primary Examiner*—Ricky Ngo
*Assistant Examiner*—Christine Ng

(57) ABSTRACT

A CDMA system according to an embodiment of the invention employs a technique for power optimized user loading that obtains a desired allocation of different radio configuration calls. The technique takes advantage of the relatively low power requirements of RC3 calls for low load conditions, while increasing the number of RC4 calls for high load conditions. As the load increases, the percentage of RC4 calls increases while the percentage of RC3 calls decreases. The technique strives to minimize overall power consumption in the system for all call load conditions, by maximizing the number of RC3 calls at any given time while keeping Walsh code resources available for both new calls and hand-in traffic.

18 Claims, 5 Drawing Sheets

SYSTEM AND METHOD FOR POWER-OPTIMIZED USER LOADING OF A CDMA COMMUNICATION SYSTEM

TECHNICAL FIELD

The present invention relates generally to code division multiple access ("CDMA") communication systems. More particularly, the present invention relates to a technique for managing calls that utilize different radio configurations.

BACKGROUND

The prior art is replete with CDMA communication systems, including cellular telephone systems that can handle voice and/or data traffic. Briefly, a CDMA system utilizes binary orthogonal codes to enable multiple users to occupy the same time and frequency allocations within the system. The codes enable a CDMA system to establish multiple communication channels using a shared frequency spectrum. A system configured in accordance with CDMA 1× technology utilizes two primary radio configuration modes to carry information, namely, RC3 and RC4. The RC3 mode utilizes 64 Walsh codes, each of which is 64 bits long. Three of the RC3 Walsh codes are reserved for overhead use, namely, one pilot channel, one paging channel, and one sync channel per base station transceiver subsystem ("BTS"). Consequently, in a practical system, 61 RC3 Walsh codes are available to support user calls.

The RC4 mode utilizes 128 Walsh codes, each of which is 128 bits long. Two related RC4 Walsh codes can be derived from a single RC3 Walsh code. Accordingly, although only 61 RC3 Walsh codes are available to support user calls, 122 RC4 Walsh codes are available to support user calls. The RC4 mode, however, requires more power (on average) per forward link than the RC3 mode. Specifically, RC4 calls require approximately 10% more operating power than RC3 calls. Consequently, older generation CDMA systems having strict power consumption requirements do not support RC4 calls. Furthermore, until recent improvements in practical CDMA system power consumption, a CDMA system that exclusively handled RC3 calls would typically consume all of its available operating power (from the BTS perspective) before exhausting the supply of RC3 Walsh codes. Current systems, however, may assign all of the available RC3 Walsh codes while having excess operating power to spare.

Some existing systems exclusively handle RC4 calls. A practical system that utilizes the RC4 mode for all calls would likely run out of power before exhausting all of the available RC4 Walsh codes. A CDMA system that supports both RC3 and RC4 modes can therefore take advantage of the practical tradeoff between limited system resources for operating power and Walsh code availability. In general, a power limited system that uses a mix of RC3 and RC4 calls can realize a higher capacity than a system that uses only one or the other. In practice, the total number of users, the number of RC3 users, the number of RC4 users, the average power consumption per RC3 user, and the average power consumption per RC4 user will dynamically vary as each BTS in the system establishes new calls, accepts hand-in calls, terminates existing calls, and hands off calls.

Accordingly, it is desirable to have a methodology and system for providing a practical balance of RC3 and RC4 calls within a CDMA system. In addition, it is desirable to have a methodology and system that seeks to minimize or optimize the CDMA system power consumption at all load levels. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of CDMA systems and that the system described herein is merely one exemplary application for the invention.

For the sake of brevity, conventional techniques related to CDMA systems, CDMA call processing, data transmission, signaling, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
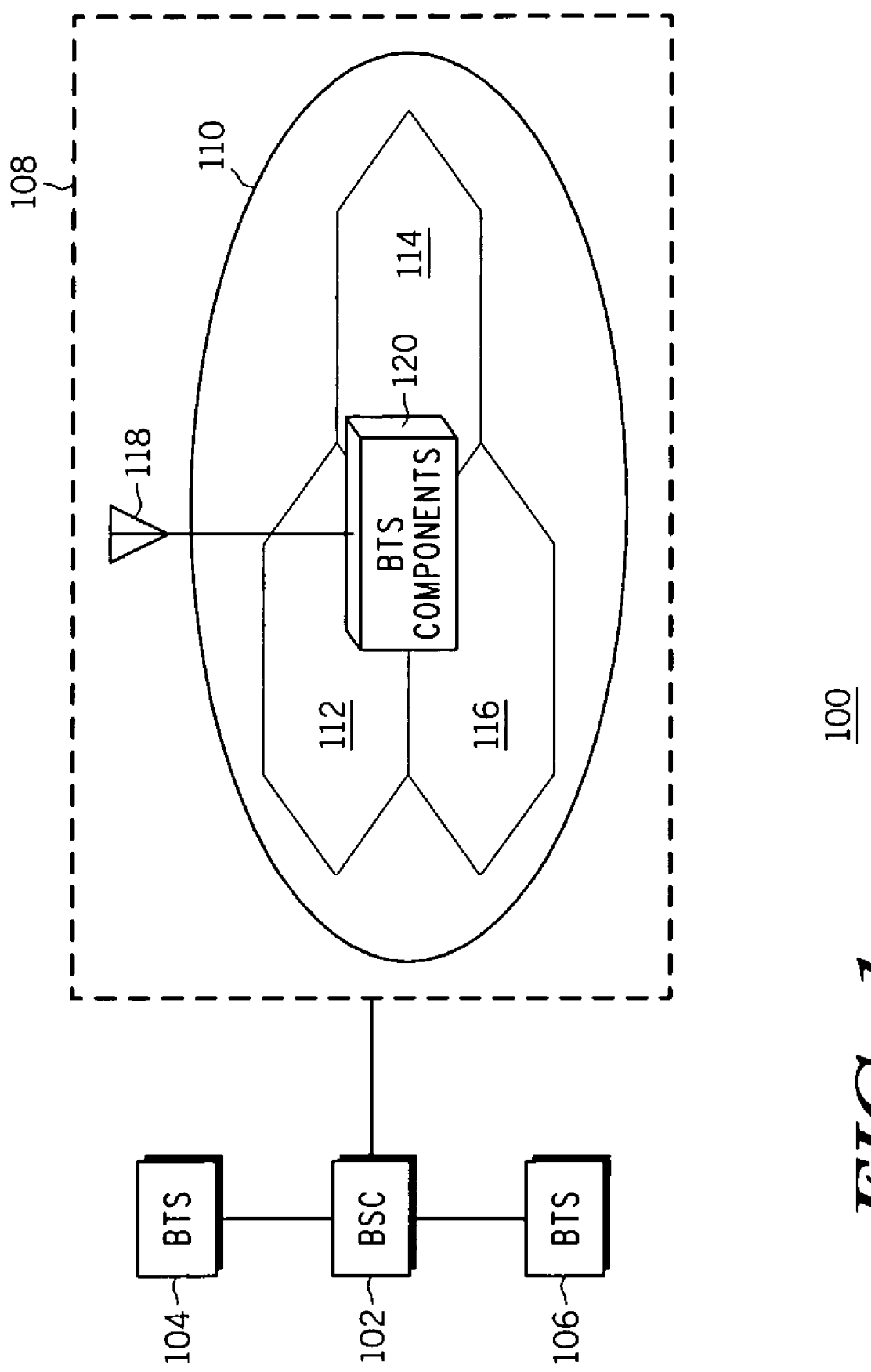
FIG. 1 is a schematic representation of a portion of a CDMA system.

FIG. 1 is a simplified schematic representation of a portion of a CDMA system 100, which may be suitably configured in accordance with an embodiment of the invention. CDMA system 100 includes a controller component, e.g., a base station controller ("BSC") 102, which may communicate with and be coupled to any number of BTSs (identified by reference numbers 104, 106, and 108). In accordance with conventional CDMA systems, BSC 102 may be coupled to the public switched telephone network (not shown) to facilitate communications between traditional telephone users and mobile stations such as cellular telephones. BSC 102 is suitably configured to control and manage the operation of BTSs 104/106/108, and may perform call switching, traffic management, and other services for CDMA system 100. BSC 102 may also be configured to carry out a number of the techniques and processes described herein.

Figure 3:
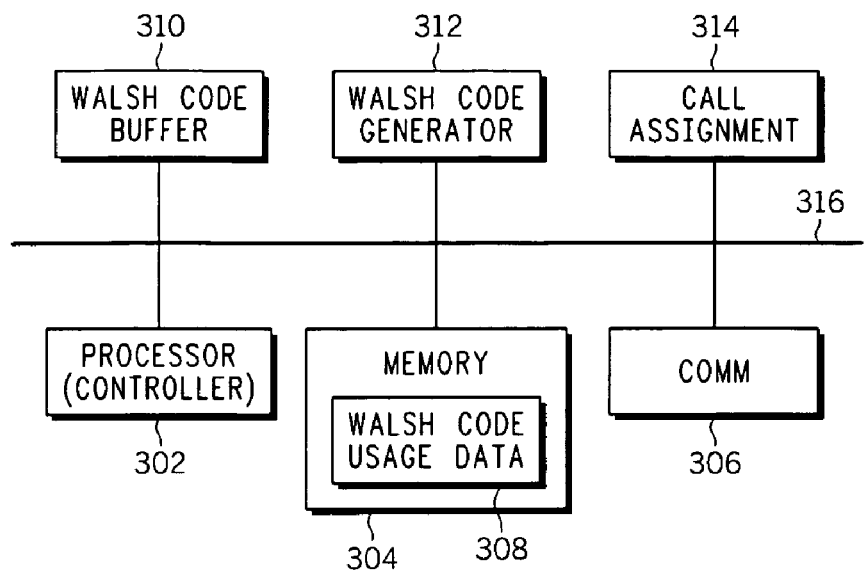
FIG. 3 is a schematic representation of a component of a CDMA system configured in accordance with an embodiment of the invention.

Traditionally, a BTS refers to a fixed station for communicating with mobile stations. The term "BTS" is often used in different contexts to refer to a cell, a sector within a cell, or the physical equipment that actually performs the BTS functions. Generally, a BTS establishes the wireless link between the mobile stations and CDMA system 100. In practice, a BTS is the subsystem that actually generates the CDMA signal and transmits the signal to the mobile stations. For purposes of this description, BTS 108 is associated with a cell 110 divided into three sectors (identified by reference numbers 112, 114, and 116). In accordance with known techniques, BTS 108 may employ a directional antenna arrangement 118 that enables cell 110 to be divided into sectors 112/114/116. BTS 108 may include one or more devices, components, or subsystems 120 configured to perform various functions and processes necessary to support the operation of CDMA system 100. For example, FIG. 3 depicts several functional elements that may be associated with a BTS configured in accordance with an embodiment of the invention.

In a practical system, one CDMA user call may have multiple "legs" or connections associated with multiple sectors and/or cells; the use of multiple legs facilitates soft handoffs between sectors or cells. For a simple voice call, each leg will utilize one Walsh code, and each leg supporting a single call will be of the same radio configuration. On the other hand, several Walsh codes may be required to support a single high-speed or high-rate data call, e.g., up to 16 RC3 Walsh codes for a single 144 Kilobit per second data call.

In a practical embodiment, BSC 102 and each BTS in CDMA system 100 may include logical or functional elements realized by hardware, software, firmware, or any combination thereof, such as one or more processors, controllers, memory elements, or the like. In accordance with the practices of persons skilled in the art, embodiments of the invention may be described herein with reference to symbolic representations of operations that may be performed by various logical, functional, or processor-based components. Such operations are sometimes referred to as being computer-executed, computerized, software-implemented, or computer-implemented. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

When implemented in software or firmware, various elements of the systems described herein (which may reside at BSC 102, the BTSs, or elsewhere in a practical CDMA system) are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links.

For purposes of the example embodiment described herein, CDMA system 100 employs CDMA 1× technology, which is capable of utilizing RC3 and RC4 for calls. The RC3 mode utilizes a first category of codes (e.g., RC3 Walsh codes), to facilitate communication between a BTS and a mobile station, where an RC3 Walsh code is represented by a sequence of 64 bits. In contrast, the RC4 mode utilizes a second category of codes (e.g., RC4 Walsh codes) to facilitate communication between a BTS and a mobile station, where an RC4 Walsh code is represented by a sequence of 128 bits. Although RC3 calls require less average power than RC4 calls, the number of potential RC3 users is less than the number of potential RC4 users. Generally, the invention relates to a call allocation technique that manages the number of RC3 and RC4 calls supported by a BTS such that RC3 calls dominate at lower user load levels, while the number of RC4 calls begin to increase with increasing user load levels. At higher load levels, the call allocation technique effectively increases the number of RC4 calls while decreasing the number of RC3 calls. This tradeoff may be necessary when the amount of call traffic exceeds the number of available RC3 Walsh codes and when the system has excess operating power to spare. The balancing of call configurations results in a desirable mix of RC3 calls (each of which has a relatively low average power consumption per forward link) and RC4 calls (each of which has a relatively high average power consumption per forward link in comparison to RC3 calls). An embodiment of the invention provides a solution that strives to maximize the ultimate load capacity of the system while minimizing power consumption as users are added to the system.

Figure 2:
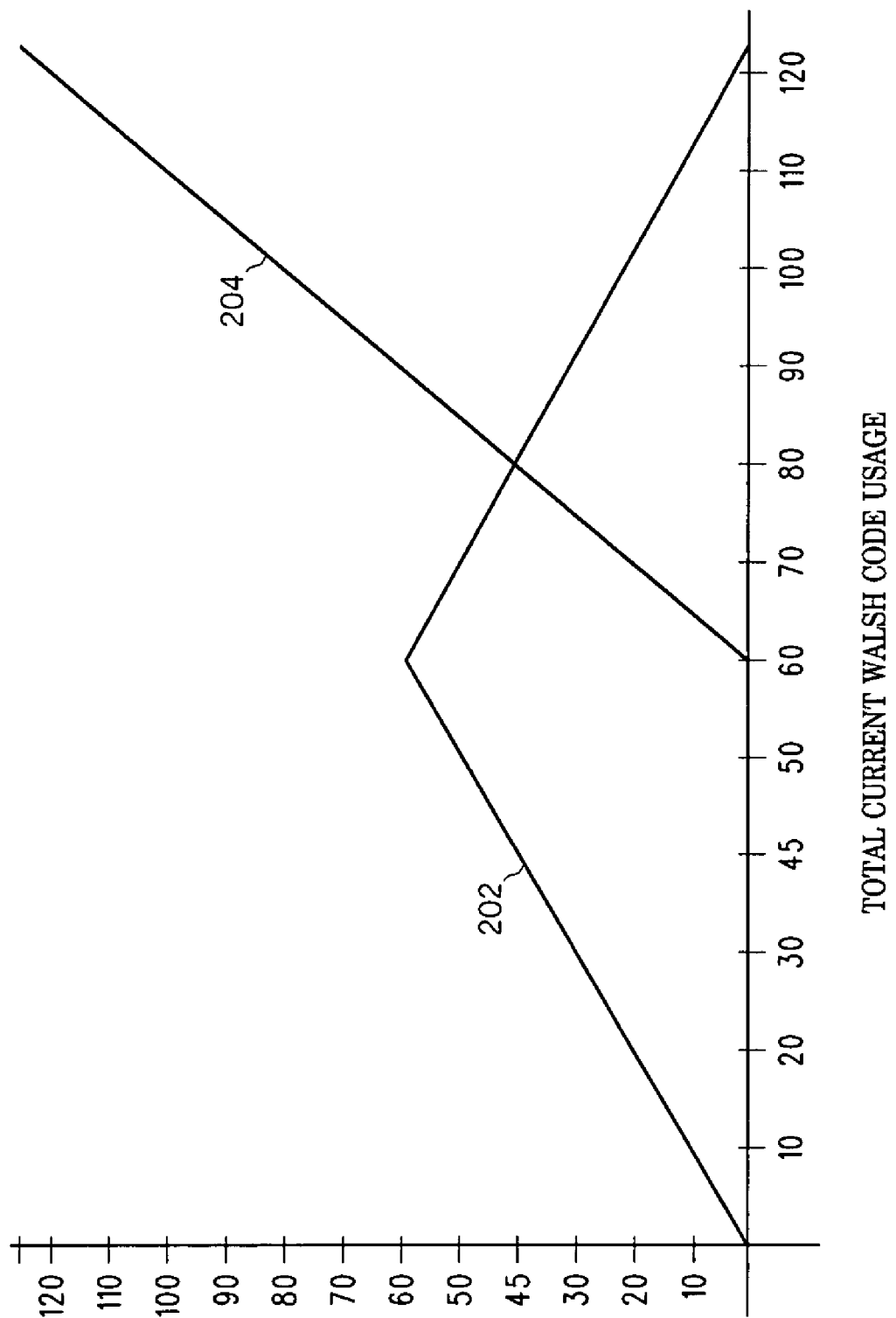
FIG. 2 is a graph depicting the allocation of RC3 and RC4 in accordance with an embodiment of the invention.

FIG. 2 is a graph depicting the allocation of RC3 and RC4 calls in accordance with one example embodiment of the invention. This graph depicts activity corresponding to one sector-carrier associated with a BTS. The vertical scale represents the current number of Walsh codes in use, and the vertical scale is applicable to both RC3 and RC4 calls. In practice, a maximum of 61 RC3 Walsh codes and a maximum of 122 RC4 Walsh codes can be assigned to user calls (the remaining Walsh codes are reserved for overhead channels). Consequently, the vertical scale of the graph extends beyond 61 to accommodate the 122 RC4 Walsh codes. The horizontal scale represents the total current number of Walsh codes in use by the CDMA system, which may reflect RC3 Walsh codes, RC4 Walsh codes, or a combination thereof. As described in more detail below, the total current number may include the number of RC3 Walsh codes actually in use, the number of RC4 Walsh codes actually in use, a reserved number of RC3 Walsh codes that serve as a "buffer" for purposes of establishing new calls (RC3 or RC4 calls) as necessary to satisfy dynamic traffic demand, and possibly a number of Walsh codes reserved to support high data rate calls that require a block of related codes.

The call allocation technique employed by CDMA system 100 can be explained with reference to the graph in FIG. 2. FIG. 2 includes an RC3 plot 202 corresponding to the number of RC3 Walsh codes in use at any given load level, and an RC4 plot 204 corresponding to the number of RC4 Walsh codes in use at any given load level. The graph represents a hypothetical situation where only RC3 Walsh codes are in use at lower load levels. In a practical embodiment, there may be a blend of RC3 and RC4 Walsh codes in use at any given time due to hand-in traffic, Walsh code fragmentation, or other system or call traffic nuances that may impact the allocation of radio configurations. The technique leverages the relationship between RC3 and RC4 Walsh codes, namely, that one RC3 Walsh code can be "traded" for two RC4 Walsh codes. In other words, two RC4 Walsh codes can be derived from one RC3 Walsh code. The technique strives to maximize the number of RC3 Walsh codes currently in use, given the current Walsh code demand (which is related to the current call traffic demand). In response to the desired call allocation, CDMA system 100 can establish new calls using either RC3 or RC4.

One straightforward application of the call allocation process employs a threshold number of 61 (which is the maximum potential number of RC3 Walsh codes) such that, if the current number of Walsh codes needed for call support is less than or equal to the threshold, then RC3 Walsh codes are used. If, however, the current number of Walsh codes needed for call support exceeds 61, then the system utilizes RC4 Walsh codes and reduces the number of RC3 Walsh codes. The desired allocation of RC3 and RC4 Walsh codes can be determined by maximizing the number of RC3 Walsh codes and realizing that two RC4 Walsh codes can be "traded" for one RC3 Walsh code. This technique, however, completely consumes all of the available Walsh code space while optimizing the power for the current Walsh code demand, thus leaving no residual RC3 Walsh codes for new calls, hand-in call traffic, or high data rate calls that may require a combination of related RC3 Walsh codes.

One preferred embodiment of the invention employs a Walsh code margin or buffer that represents a number of reserved RC3 Walsh codes that can be assigned to support new calls, high speed calls, or hand-in calls as needed. As mentioned above, this buffer may be added to the current Walsh code demand determination before CDMA system 100 calculates the desired RC3/RC4 blend. In practice, a margin or buffer of 8 RC3 Walsh codes (or, equivalently, 8 pairs of related RC4 Walsh codes) is normally sufficient to avoid blocking of new or hand-in calls. Alternatively, a larger buffer of 12 RC3 Walsh codes (or, equivalently, 12 pairs of related RC4 Walsh codes) may be desirable to accommodate high-speed data traffic. In practice, the buffer includes at least one group of related RC3 Walsh codes that are capable of supporting a higher data rate relative to any single RC3 Walsh code. Those skilled in the art will recognize that such grouping may be necessary to ensure that the appropriate RC3 Walsh codes can be "combined" for purposes of establishing a high data rate call. For purposes of the following example, the buffer size is assumed to be 12 RC3 Walsh codes.

From a practical implementation standpoint, an average voice calls lasts approximately 100 seconds and, therefore, most of the call load in a system turns over approximately every two minutes. In addition, the new call arrival rate is relatively low—each sector has 122 maximum potential calls but an average of only two new calls per two-second reporting period. In a practical system, the desired RC3 operating target may vary significantly from one two-second reporting period to the next. Such variation may be caused, for example, by high speed SCH data connections that require a large number of Walsh code resources for a short period of time. The relatively low call arrival rate, however, naturally smoothes out such variations in operating point targets, and, in practice, the two-second reporting period influences only a few new calls.

Referring again to FIG. 2, the Walsh code buffer is included in the total current Walsh code usage count. Therefore for the example implementation, the threshold number (e.g., 61) actually represents the condition where 49 RC3 Walsh codes are in use and 12RC3 Walsh codes are in reserve. Before this threshold is exceeded, only RC3 Walsh codes are assigned. This trend is shown in FIG. 2, where plot 202 rises to meet the threshold number of 61 while, for the same load levels, no RC4 Walsh codes are assigned. After this threshold is exceeded, the CDMA system 100 begins to assign RC4 Walsh codes to new calls by deriving RC4 Walsh codes from RC3 Walsh codes in the buffer. As the total current load continues to increase, additional RC4 Walsh codes may be extracted from the buffer, thus further increasing the number of RC4 Walsh codes in use while further decreasing the number of RC3 Walsh codes in use. The size of the Walsh code buffer reserve is preferably selected to minimize the likelihood of call blockage. In a practical system where calls are established, handed in, handed out, and terminated on a fairly regular basis, additional RC3 Walsh codes may become available in a dynamic manner. If total usage continues to increase, such additional RC3 Walsh code resources may be utilized (in addition to any reserved RC3 Walsh codes) for purposes of assigning RC4 Walsh codes to new calls.

Unlike other capacity optimization algorithms and techniques, the call allocation methodology described above minimizes the forward power at all load levels. In addition, the call allocation methodology need not compute the current power consumption to select a desired blend of RC3 and RC4 calls. The call allocation technique uses as many power-conservative RC3 Walsh codes as possible, thus rendering ongoing power calculations unnecessary. Furthermore, if the CDMA system exhausts its operating power using this technique, the preference toward RC3 Walsh code usage results in an optimized RC3/RC4 mix at the point of power exhaustion.

FIG. 3 is a schematic representation of a component, such as a BTS 300, of a CDMA system configured in accordance with an embodiment of the invention. Although not shown in FIG. 3, a practical BTS 300 will include a number of functional elements, logical elements, and/or hardware components that support conventional CDMA system features and functions unrelated to the invention. BTS 300 generally includes a processor (or controller) 302, a suitable amount of memory 304, a data communication element 306, Walsh code usage data 308 (which may be received by BTS 300 and stored in memory 304), a Walsh code buffer 310, a Walsh code generator 312, and a call assignment element 314. BTS 300 may include a data bus 316 to facilitate communication of data or control signals between some or all of the above components.

Processor 302 may be any general purpose microprocessor, controller, or microcontroller that is suitably configured to control the operation of BTS 300, or at least govern the processes described herein. Memory 304 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As described in more detail below, memory 304 is capable of storing Walsh code and/or call usage data 308 received from a BSC.

Communication element 306 is configured to communicate with the BSC that controls the operation of BTS 300. In particular, communication element 306 is suitably configured to receive Walsh code usage data 308 from the BSC, and to provide call assignment instructions to the BSC. In this regard, communication element 306 and any corresponding logical or software elements, individually or in combination, are example means for obtaining a current number of codes in use. In the example embodiment, communication element 306 communicates with the BSC in accordance with data communication protocols and techniques utilized by known CDMA systems. Communication element 306 may be realized with hardware, software, and/or firmware using known techniques and technologies.

Walsh code buffer 310 may be realized in memory 304 as a suitably configured database that contains or otherwise represents a reserved number of RC3/RC4 Walsh codes. The size of Walsh code buffer 310 may be dictated by the requirements of the particular system. Walsh code generator 312 may be realized as processing logic configured to derive RC4 Walsh codes from related RC3 Walsh codes, to distill RC4 Walsh codes into root RC3 Walsh codes, and to otherwise process the different codes as further described herein. Walsh code generator 312 may be utilized during the RC3/RC4 call assignment processes described herein.

Call assignment element 314 may also be realized as processing logic configured to assign specific radio configurations to call traffic supported by BTS 300. Call assignment element 314 is preferably configured to perform the various analyses and threshold determinations described in more detail herein. In this regard, call assignment element 314 and any corresponding logical or software elements, individually or in combination, is an example means for assigning a radio configuration to a new call. In addition, call assignment element 314 and any corresponding logical or software elements, individually or in combination, is an example means for adjusting (e.g., increasing and decreasing) the number of calls utilizing RC3 and RC4 in response to increasing current user load of BTS 300.

Generally, the various functional and logical elements depicted in FIG. 3 are suitably configured to carry out the call assignment and load optimizing techniques described herein. In practice, each BTS in a CDMA system may include such added functionality to enable system-wide optimization of call loading.

Figure 4:
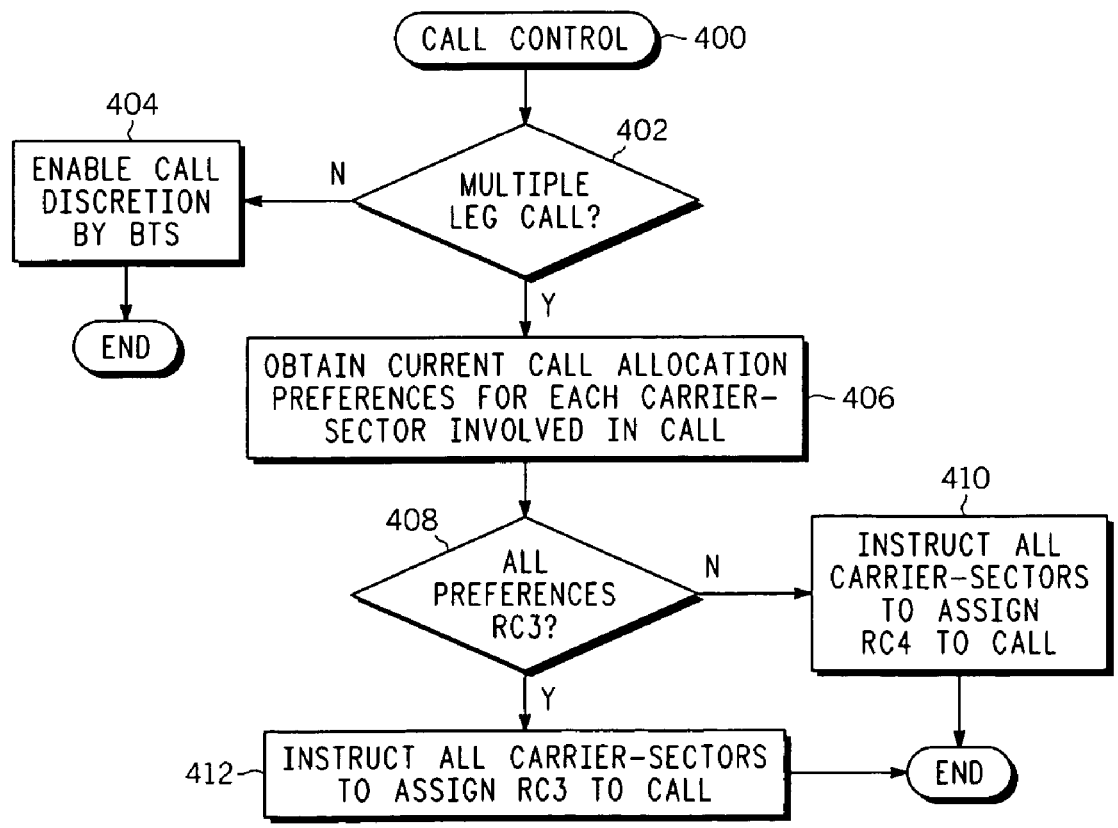
FIG. 4 is a flow chart of a call control process according to an embodiment of the invention.

FIG. 4 is a flow chart of a call control process 400 according to an embodiment of the invention. The various tasks performed in connection with process 400 may be performed by software, hardware, firmware, or any combination thereof. For illustrative purposes, the following description of process 400 may refer to elements described elsewhere herein. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Although not a requirement of the invention, a BSC may perform process 400 in a practical CDMA system. Process 400 assumes that the BSC is capable of supporting a plurality of BTSs and a plurality of sector-carriers associated with the BTSs. Process 400 may be performed whenever a new call is to be requested by the BSC.

Call control process 400 begins by determining whether the new call is a single leg call or a multiple leg call (query task 402). If the new call will be a single leg call, then process 400 enables call discretion by the appropriate BTS (task 404). In other words, process 400 need not perform any call allocation techniques and, instead, allows the BTS to make the call allocation decision. If, however, the new call will be a multiple leg call, then process 400 may continue to determine how best to assign the call type.

For multiple leg calls, call control process 400 obtains the current call allocation preferences for each carrier-sector (or BTS) to be involved in the call. As described in more detail below, each call allocation preference represents the desired call type as indicated by the respective carrier-sector, and the BTSs may provide the call allocation preferences along with a channel response or other suitable message that is generated in response to each new call setup. If all of the call allocation preferences are for RC3 calls (query task 408), then process 400 instructs all of the involved carrier-sectors to assign RC3 to the new call (task 412). On the other hand, if any one of the call allocation preferences is for an RC4 call, then process 400 instructs all of the involved carrier-sectors to assign RC4 to the new call (task 410). In practice, this technique satisfies the requirements of the "least common denominator" carrier-sector while still maintaining the standard CDMA requirement of having the same radio configuration supporting a multiple leg call. Notably, once the BSC formulates its call allocation instructions (whether RC3 or RC4), the BTSs involved in the call are given no discretion to select a different radio configuration for the call.

Figure 5:
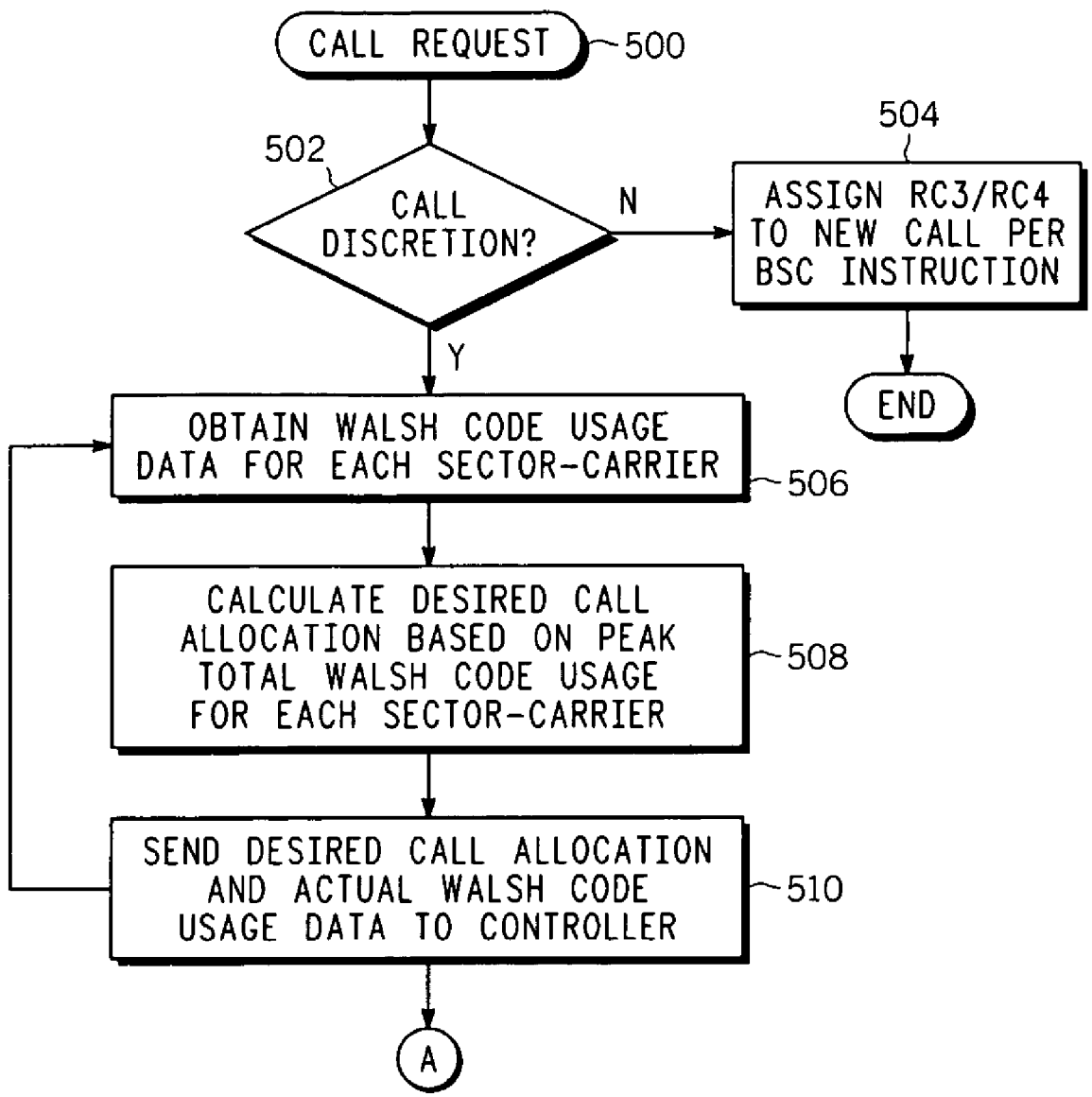
FIGS. 5 and 6 represent a flow chart depicting a new call request process according to an embodiment of the invention.
Figure 6:
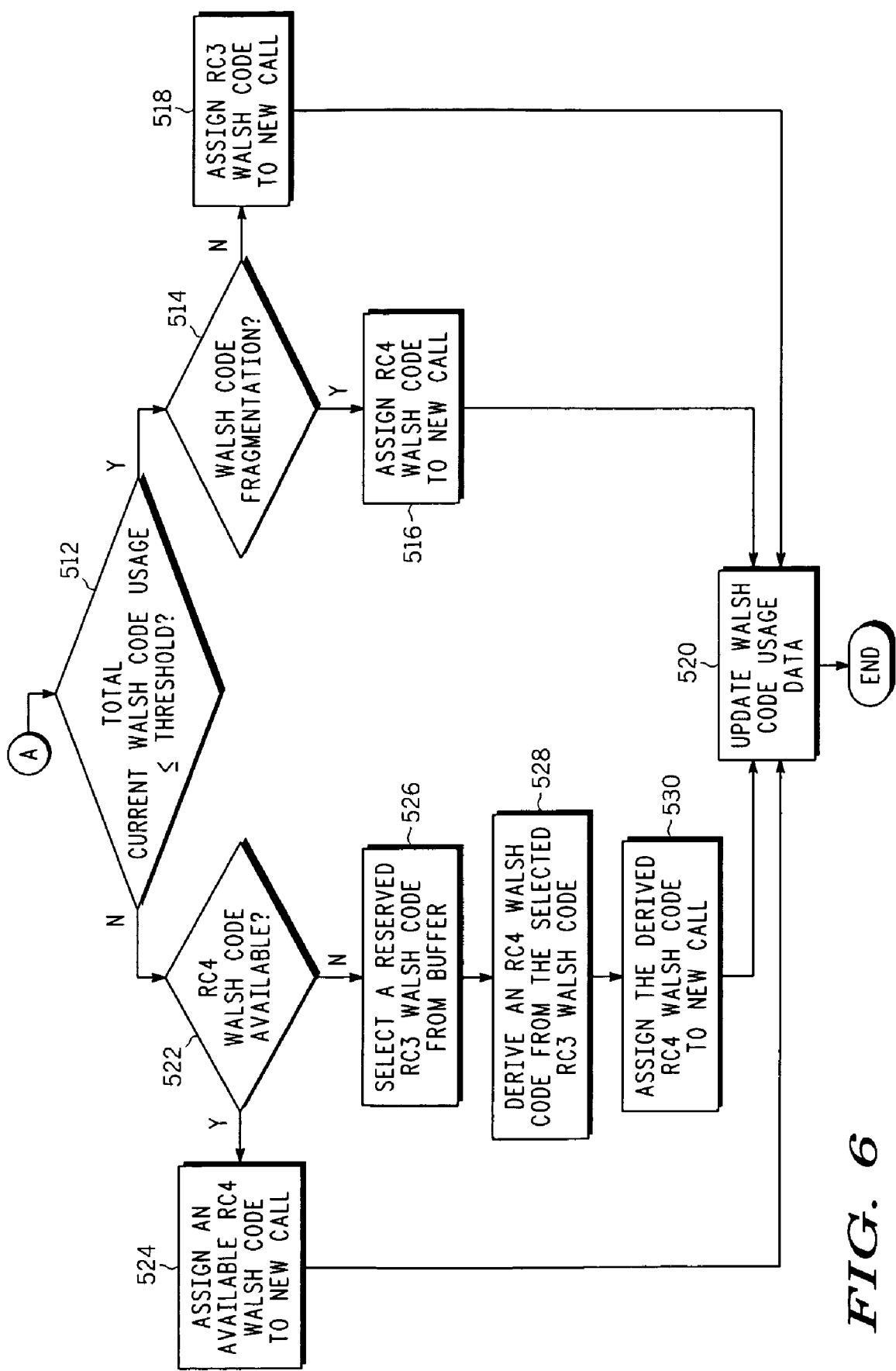

FIGS. 5 and 6 represent a flow chart depicting a call request process 500 according to an embodiment of the invention. The various tasks performed in connection with process 400 may be performed by software, hardware, firmware, or any combination thereof. For illustrative purposes, the following description of process 500 may refer to elements mentioned above in connection with FIG. 1 and FIG. 3. In practical embodiments, portions of process 500 may be performed by different elements of the described CDMA system, e.g., BSC 102 or any BTS. It should be appreciated that process 500 may include any number of additional or alternative tasks, the tasks need not be performed in the illustrated order, and process 500 may be incorporated into a more comprehensive procedure or process having additional functionality not described in detail herein.

Call request process 500 is preferably performed in response to a call request received from the controlling BSC. As described above, depending upon the requested call type (e.g., a single leg call or a multiple leg call), the BTS may have the ability to select the radio configuration for the requested call. In this regard, if the BTS has no call discretion (query task 502), then process 500 assigns a radio configuration to the new call in accordance with the instructions received from the BSC (task 504). For example, if the new call is a multiple leg call, then process 500 may assign RC3 or RC4 to the respective leg of the call, depending upon the received instruction. If no appropriate Walsh codes are available for call assignment, for example, as a result of Walsh code fragmentation, then the BTS will block the call.

If the BTS has call discretion, then call request process 500 continues to perform additional call allocation techniques. Call request process 500 may leverage existing signaling and reporting techniques supported by conventional CDMA systems. For example, process 500 may obtain Walsh code usage data for each sector-carrier associated with a BTS (task 506). In this regard, the BTS may periodically (e.g., once every two seconds or on demand in response to call requests) report call usage data for each sector-carrier to the BSC. The call usage data may include, without limitation, the total number of RC3 Walsh codes in use for each sector, the total number of RC4 Walsh codes in use for each sector, the peak RC3 Walsh code usage for the reporting interval, the peak RC4 Walsh code usage for the reporting interval, the maximum Walsh code buffer size, the current number of reserved Walsh codes in the Walsh code buffer, and other information that may be useful to support standard functions of the CDMA system. In the example embodiment, the BTS obtains a current total number of Walsh codes in use, where the current total number includes a sum of the number of RC3 Walsh codes actually in use, the number of RC4 Walsh codes actually in use, and a reserved number of RC3 Walsh codes (e.g., the maximum size of the Walsh code buffer).

The BTS may calculate the desired Walsh code usage or call allocation based on the peak total Walsh code usage for each sector-carrier (task 508). For example, under low loading conditions, task 508 may determine that more RC3 calls can be safely allocated. The BTS may also send the desired Walsh code usage or call allocation, and the actual Walsh code usage data to the BSC for handling (task 510). The desired call allocation represents the call allocation preference described above in connection with process 400. Notably, the desired call allocation preference need not match the actual new call assignment, due to code fragmentation. This information may be sent to the BSC in periodic reports generated by the BTS (for example, reports sent once every two seconds or in response to each call request). The path from task 510 back to task 506 represents the ongoing periodic nature of the determination of Walsh code usage data performed by the CDMA system. Furthermore, in a practical embodiment, tasks 506, 508, and 510 may be performed and repeated continuously whether or not new calls are being established.

Again, assuming that the BTS has discretion over call assignments, call request process 500 may proceed to a query task 512. Process 500 may compare the total current Walsh code usage to a threshold number (query task 512) to determine how best to allocate RC3 and RC4 Walsh codes. As mentioned above, the threshold number may represent a maximum number of RC3 codes potentially available for user calls. In FIG. 2, this threshold number is 61, corresponding to the 64 possible RC3 Walsh codes minus the three RC3 Walsh codes reserved for overhead communication. If the total current Walsh code usage is less than or equal to the threshold, then the CDMA system will attempt to assign RC3 Walsh codes to new calls, and will attempt to otherwise maximize the number of RC3 calls supported by the BTS.

As mentioned above, a single RC3 Walsh code can serve as the root of two distinct RC4 Walsh codes. If either one of the two RC4 Walsh codes are in use, then the root RC3 Walsh code will be unavailable. In other words, both RC4 Walsh codes must be available in order to "recreate" the root RC3 Walsh code. A condition known as Walsh code fragmentation exists when one of the two related RC4 Walsh codes is unavailable, thus making the root RC3 Walsh code unavailable. Referring again to call request process 500, if Walsh code fragmentation (query task 514) precludes the establishment of a new RC3 call, then process 500 will instead assign an RC4 Walsh code (assuming one is available) to new calls (task 516). If Walsh code fragmentation is not an issue, then process 500 will assign an RC3 Walsh code to new calls (task 518). In the example embodiment, the BTS determines whether to assign RC3 or RC4 to a new call. Such distributed processing may be desirable in a practical CDMA system. Nonetheless, such processing may instead be "centralized" in a suitable controller component such as the BSC, which can then provide suitable call establishment instructions to the corresponding BTS. Eventually, process 500 updates the Walsh code usage data (task 520) to reflect any changes, e.g., to reflect the RC3/RC4 assignment of new calls. Thereafter, process 500 may end or be repeated for the next call request.

If query task 512 determines that the total current Walsh code usage exceeds the given threshold number, then call request process 500 will not automatically select an RC3 Walsh code for use with the new call. Rather, process 500 preferably proceeds with tasks associated with the assignment of RC4 to new calls. As described above, for Walsh code usage beyond the threshold point, the CDMA system begins to allocate RC4 Walsh codes to new calls and, with increasing Walsh code load levels, the CDMA system proportionately increases the amount of RC4 Walsh codes in use and proportionately decreases the amount of RC3 Walsh codes in use. This tradeoff enables the CDMA system to support an increasing number of users while still operating within the practical power limitations of the system. In other words, as the total current Walsh code usage continues to increase beyond the threshold, the percentage of RC4 Walsh codes in use also continues to increase.

In connection with the assignment of RC4 Walsh codes to new calls, call request process 500 may determine whether a suitable RC4 Walsh code (or, if applicable, a group of RC4 Walsh codes) is available for use (query task 522). If suitable RC4 Walsh code resources are available, then process 500 will assign at least one available RC4 Walsh code to the new call (task 524). Process 500 may also update the Walsh code usage data (task 520) to reflect any changes, e.g., to reflect the RC4 assignment of the new call. Thereafter, process 500 may end or be repeated for the next call request. Referring again to query task 522, if the requisite number of RC4 Walsh codes are not currently available for use, then process 500 may select a reserved RC3 Walsh code from the Walsh code buffer (task 526). In a practical implementation, if no reserved RC3 Walsh codes are available, then the system will block the new call.

Assuming that at least one suitable RC3 Walsh code is available, call request 500 derives, creates, or otherwise obtains an RC4 Walsh code from the selected RC3 Walsh code (task 528). Task 528 represents the relationship between a "root" RC3 Walsh code and the two RC4 Walsh codes that are based upon the root RC3 Walsh code. In practice, the CDMA system may obtain two RC4 Walsh codes from the selected RC3 Walsh code, make one of the derived RC4 Walsh codes available for a new call, and reserve the other derived RC4 Walsh code for future use. An RC4 Walsh code obtained in this manner can then be assigned to support the new call (task 530). As described above, process 500 may update the Walsh code usage data (task 520) to reflect the assignment of RC4 for the new call.

The technique described above results in the following generalized relationships for an example system using RC3 and RC4 Walsh codes (similar relationships can be derived for alternate practical embodiments that employ different coding schemes):

if $WC_{used}+WC_{buffer} \leq 61$, then only assign RC3 to new calls;

if $WC_{used}+WC_{buffer}=61+y$, then $WC_{RC3}=61-y$, and $WC_{RC4}=2y$;

where $WC_{used}$ is the total number of Walsh codes (both RC3 and RC4) currently in use, $WC_{buffer}$ is the maximum number of RC3 Walsh codes reserved for the buffer, $WC_{RC3}$ is the total number of RC3 Walsh codes currently in use, $WC_{RC4}$ is the total number of RC4 Walsh codes currently in use, and y is the number of Walsh codes (both RC3 and RC4) in excess of the maximum number of RC3 Walsh codes available for use.

Those skilled in the art will recognize that a practical CDMA system may include other power management procedures, call traffic handling techniques, and conventional methodologies that could be merged with the techniques described above. For example, calls that are handed into a cell or a sector-carrier continue to use their existing radio configurations and, therefore, the CDMA system does not have the discretion to change the Walsh coding of such handed-in calls. Indeed, the Walsh code margin described herein is suitably sized to accommodate hand-in calls such that the number of blocked calls can be minimized. As another example, a system that supports high speed data communication may employ a plurality of related RC3/RC4 Walsh codes to support a single high speed call. For example, a group of related RC4 Walsh codes may be utilized to support a high speed data call. The specific number of related codes utilized to support high data rate calls may vary from one system to another, and the number may be adjustable in response to current system requirements, load levels, power management, or the like. Due to Walsh code fragmentation, however, the requisite number or grouping of related RC4 Walsh codes may not be available at all times. To address this issue, a CDMA system may reserve an entire branch of RC3/RC4 Walsh codes for use with high speed data calls. In this regard, the reserved Walsh codes are considered to be in use at all times and the total current Walsh code usage (see FIG. 2) includes the number of Walsh codes reserved for high data rate applications.

The techniques described above may also be equivalently applied to support CDMA systems that utilize radio configurations in addition to or other than RC3 and RC4, e.g., RC1, RC2, and/or RC5. For example, for older systems (such as IS-95 systems that utilize RC2), it may be necessary to include other radio configuration codes in the total current Walsh code usage before determining the desired call allocation. In addition, the call allocation methodology of the invention can be utilized to obtain an desired mix of different radio configuration calls where a tradeoff exists between power consumption and Walsh code availability for the different radio configurations.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for managing loading in a code division multiple access ("CDMA") communication system, said CDMA communication system being capable of establishing calls in accordance with a first radio configuration that utilizes a first category of codes, and calls in accordance with a second radio configuration that utilizes a second category of codes, said method comprising:
   obtaining a current number of codes in use;
   if said current number is less than or equal to a threshold, assigning said first radio configuration to new calls;
   if said current number is greater than said threshold, assigning said second radio configuration to new calls such that the percentage of said current number utilizing said second radio configuration increases as said current number increases, and
   wherein said current number includes the number of said first category of codes actually in use, the number of said second category of codes actually in use, and a reserved number of said first category of codes.

2. A method according to claim 1, wherein said reserved number is at least 12.

3. A method according to claim 1, further comprising:
   selecting a reserved code from said reserved number of said first category of codes; and
   deriving, from said reserved code, at least one additional code for said second category of codes, said deriving step being performed if said current number is greater than said threshold.

4. A method according to claim 1, wherein said first radio configuration is RC3, and said second radio configuration is RC4.

5. A method according to claim 1, wherein said first category of codes comprises 64-bit Walsh codes.

6. A method according to claim 1, wherein said second category of codes comprises 128-bit Walsh codes.

7. A method according to claim 1, wherein said threshold represents a maximum number of codes from said first category of codes potentially available for user calls.

8. A method according to claim 1, wherein:
   said first radio configuration has a first average power consumption per forward link;
   said second radio configuration has a second average power consumption per forward link; and
   said second average power consumption is greater than said first average power consumption.

9. A method according to claim 1, wherein assigning said first radio configuration to new calls and assigning said second radio configuration to new calls conserves operating power at all user load levels.

10. A method for managing loading in a code division multiple access ("CDMA") communication system, said CDMA communication system being capable of establishing calls in accordance with a first radio configuration that utilizes a first category of codes, and calls in accordance with a second radio configuration that utilizes a second category of codes, said method comprising:
    obtaining a current number of codes in use;
    if said current number is less than or equal to a threshold, assigning said first radio configuration to new calls;
    if said current number is greater than said threshold, increasing the number of calls utilizing said second radio configuration and decreasing the number of calls utilizing said first radio configuration as said current number increases, and
    wherein said current number includes the number of said first category of codes actually in use, the number of said second category of codes actually in use, and a reserved number of said first category of codes.

11. A method according to claim 10, further comprising:
    selecting a reserved code from said reserved number of said first category of codes; and
    deriving, from said reserved code, at least one additional code for said second category of codes, said deriving step being performed if said current number is greater than said threshold.

12. A method according to claim 10, wherein said first radio configuration is RC3, and said second radio configuration is RC4.

13. A method for managing loading in a code division multiple access ("CDMA") communication system, said CDMA communication system being capable of establishing both RC3 calls that utilize RC3 Walsh codes, and RC4 calls that utilize RC4 Walsh codes, said method comprising:
    obtaining a total number of Walsh codes required to support current call loading;
    if said total number is less than or equal to a threshold, establishing new calls as RC3 calls;
    if said total number is greater than said threshold, increasing the number of RC4 calls and decreasing the number of RC3 calls as said total number increases, and wherein said total number of Walsh codes includes the number of said RC3 Walsh codes actually in use, the number of said RC4 Walsh codes actually in use, and a reserved number of said RC3 Walsh codes.

14. A method according to claim 13, further comprising deriving, from said reserved number of said RC3 Walsh codes, at least one RC4 Walsh code for establishing a new call, said deriving step being performed if said total number is greater than said threshold.

15. A method according to claim 13, wherein establishing new calls as RC3calls, increasing the number of RC4calls, and decreasing the number of RC3 calls conserves operating power at all user load levels.

16. An apparatus for a code division multiple access ("CDMA") communication system, said CDMA communication system being capable of establishing calls in accordance with a first radio configuration utilizing a first category of codes, and calls in accordance with a second radio configuration utilizing a second category of codes, said apparatus comprising:
   means for obtaining a current number of codes in use;
   means for assigning said first radio configuration to new calls, if said current number is less than or equal to a threshold; and
   means for proportionately increasing the number of calls utilizing said second radio configuration and proportionately decreasing the number of calls utilizing said first radio configuration as said current number increases, if said current number is greater than said threshold, and
   wherein said means for obtaining is configured to obtain said current number in response to the number of said first category of codes actually in use, the number of said second category of codes actually in use, and a reserved number of said first category of codes.

17. An apparatus according to claim 16, wherein said threshold represents a maximum number of codes from said first category of codes potentially available for user calls.

18. A code division multiple access ("CDMA") communication system comprising:
   a base station transceiver configured to establish calls in accordance with a first radio configuration utilizing a first category of codes, and calls in accordance with a second radio configuration utilizing a second category of codes; and
   a controller coupled to said base station transceiver, said controller comprising processing logic configured to:
   obtain a current number of codes in use by said base station transceiver;
   assign said first radio configuration to new calls supported by said base station transceiver, if said current number is less than or equal to a threshold; and
   as said current number increases beyond said threshold, proportionately increase the number of calls supported by said base station transceiver and utilizing said second radio configuration, and proportionately decrease the number of calls supported by said base station transceiver and utilizing said first radio configuration, and
   wherein said means for obtaining is configured to obtain said current number in response to the number of said first category of codes actually in use, the number of said second category of codes actually in use, and a reserved number of said first category of codes.

* * * * *